June 24, 1924.  
M. TATOSIAN  
TRACTOR SLED  
Filed Feb. 23, 1923  
1,499,037

Inventor  
Martin Tatosian

By Chamberlain & Newman  
Attorneys

Patented June 24, 1924.

1,499,037

UNITED STATES PATENT OFFICE.

MARTIN TATOSIAN, OF BRIDGEPORT, CONNECTICUT.

TRACTOR SLED.

Application filed February 23, 1923. Serial No. 620,621.

*To all whom it may concern:*

Be it known that MARTIN TATOSIAN, a citizen of the United States, and resident of Bridgeport, in the county of Fairfield and State of Connecticut, has invented certain new and useful Improvements in Tractor Sleds, of which the following is a specification.

The present invention relates to an improved tractor sled, and has for its object to provide a vehicle of this character, which may be used as a snow or ice sled, and which may be propelled, when desired, in the manner of a caterpillar tractor, the traction mechanism being used as an auxiliary to the sled runners to propel the vehicle over level stretches of snow or ice covered ground. Another object is to provide a vehicle which may be converted from a sled to a wheeled vehicle, so that the same may be used at all seasons of the year. A further object is to provide such a vehicle, which may be propelled with relatively great speed and facility, and which may be effectually steered to direct its course.

With the above and other objects in view, embodiments of the invention are shown in the accompanying drawings, and these embodiments will be hereinafter more fully described with reference thereto, and the invention will be finally pointed out in the claims.

In the drawings:—

Similar reference characters indicate corresponding parts throughout the several figures of the drawings.

Figure 1:
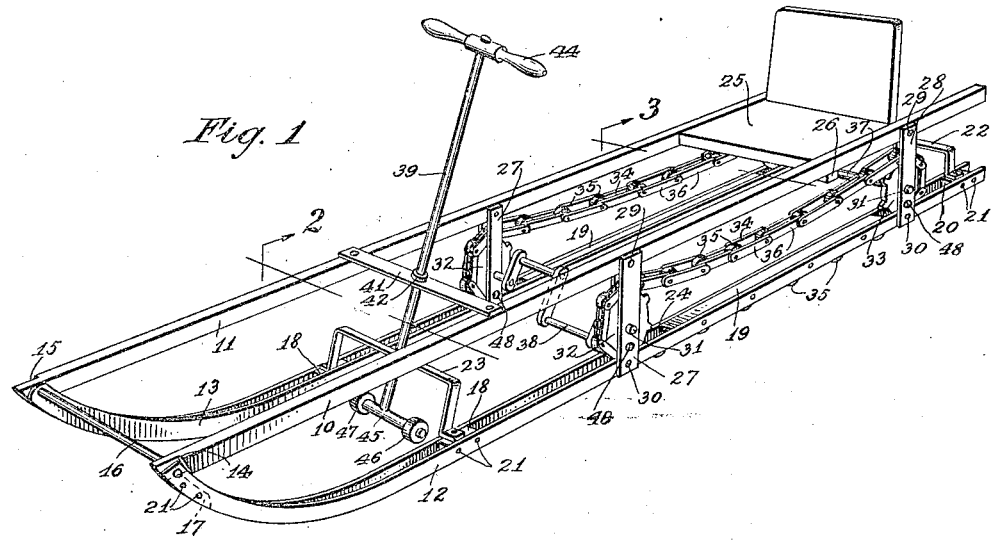
Fig. 1 is a perspective view of a vehicle according to my invention.
Figure 2:
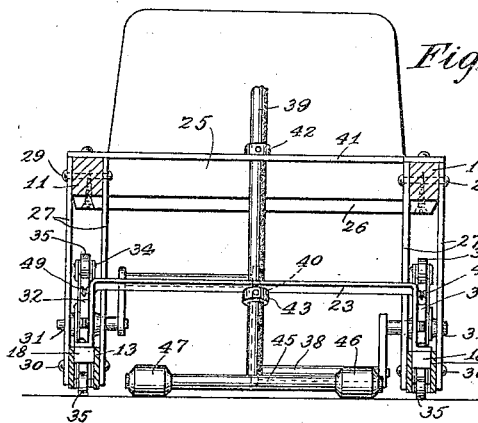
Fig. 2 is a vertical sectional view taken along the line 2 of Fig. 1.
Figure 3:
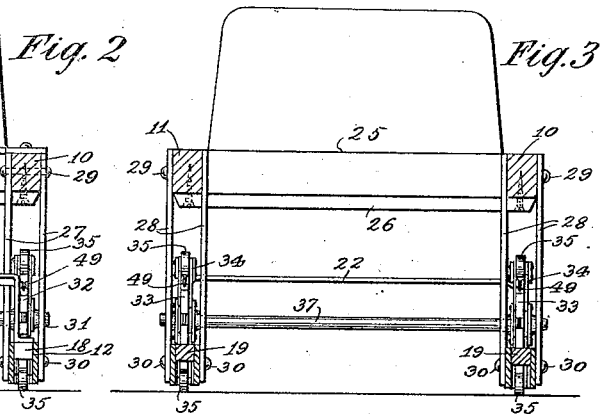
Fig. 3 is a vertical sectional view taken along the line 3 of Fig. 1.
Figure 4:
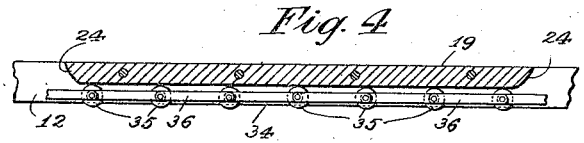
Fig. 4 is a longitudinal sectional view of a portion of one of the runners.

Referring to the drawings, the vehicle comprises a pair of parallel upper rails 10 and 11, preferably of wood, and metal runners 12 and 13, each consisting of a pair of spaced metal strips having their lower edges contiguous to the ground, these strips being curved upwardly at their forward ends, where they are connected to the recessed end portions 14 and 15 of the rails by a cross bar 16.

The two strips forming each of the runners are spaced apart and braced by a series of blocks 17, 18, 19 and 20, secured by bolts or rivets 21 to the strips, the first blocks 17 being contiguous to the forward ends of the rails 10 and 11, and flush with the under edges of the strips, while the last blocks 20 are adjacent the rear ends of the runners and have an inverted U-shaped cross bar or brace 22 secured at its ends thereto.

The blocks 18 are just rearwardly of the upward curve of the runners, and have an inverted U-shaped cross bar or brace 23 secured at its ends thereto, this brace being slightly inclined rearwardly for the purpose of supporting the steering post hereinafter more fully referred to.

The blocks 19 which are relatively long and disposed intermediately the blocks 18 and 20 are provided at their ends with beveled surfaces 24, and are adapted to form an upper supporting surface and guide for the traction chain hereinafter more fully referred to. The under surfaces of the blocks 18, 19 and 20 are spaced from the lower edges of the runners, so as not to form obstructions when the vehicle is running over snow or ice.

A seat 25 is secured between the rails, toward the rear end of the vehicle, upon a pair of cross braces 26 screwed to the rails.

At each end of the blocks 19 and in spaced relation thereto, there are provided pairs of upright bars 27 and 28, connected at their upper ends to the rails by bolts 29, and at their lower ends to each of the strips forming the runners, by rivets 30, these bars being suitably apertured, as at 31 to form bearings for the front and rear sprocket gears 32 and 33, and over which gears the endless sprocket chains 34 extend, their lower reaches moving beneath and in contact with the under surfaces of the elongated blocks 19. The chains consist of a series of spaced rollers 35 and connecting links 36 alternately staggered, the rollers being of such diameter that when they are in engagement with the under surface of the blocks 19, they project below the lower edges of the runners into engagement with the ground, forming a continuous ground-engaging traction element. The rear sprocket gears are mounted on a straight shaft 37, while the front gears are secured upon the ends of a crank shaft 38, having diametrically opposed pedal portions adapted to be engaged and operated by the feet of the person seated in the vehicle.

The steering gear comprises a post 39 rotatably supported in an aperture 40 of the brace bar 23, and in a centrally apertured bar 41 secured at its ends to the rails, a pair of collars 42 and 43 fixing the post against longitudinal movement. A handle 44 is provided at its upper end, and at its lower end there is secured a transverse bar 45 having rollers 46 and 47 at its ends, which extend below the lever of the lower edges of the runners into engagement with the ground. In operation this steering mechanism effectually guides the vehicle, turning it to the right or left, as desired, the roller at one side being slightly lifted from the ground, when the bar is turned to steer the vehicle to the other side. The mechanism also effectually steers the vehicle when it is being driven over snow or ice covered ground.

Figure 5:
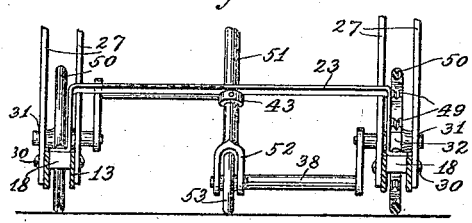
Fig. 5 is a vertical sectional view, with parts broken away and showing a modified form of steering mechanism and the sled converted to a wheeled vehicle.

For the purpose of converting the sled for use as a wheeled vehicle, the uprights 27 and 28 are provided with apertures 48, in spaced relation below the apertures 31, and in which the shafts 37 and 38 are engaged to lower the gears. The sprocket chain may be used as a tractor element, in the manner of a caterpillar tractor, or as shown in Fig. 5 the teeth of the gears may be provided with notched recesses 49, in which a rubber tire 50 is engaged, the sprocket chain being removed. In this form of the invention a modified form of a steering gear is employed in which the steering post 51 is provided with a forked end portion 52 having a single wheel 53 rotatably mounted therein, the periphery being preferably rounded, as shown, so that the wheel may turn freely with the angular relation of the steering post.

Figure 6:
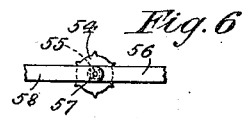
Fig. 6 is a detail fragmentary view of a modified form of tractor roller.

In Fig. 6 I have illustrated a modified form of roller or traction member for propelling the vehicle over ice by foot power. In this form a roller 54 is provided having a roughened or spiked surface, and may be non-rotatably mounted in the chain, by providing a squared shaft 55 non-rotatably engaging the roller and inner links 56 and having rounded ends 57 rotatably engaging the outer links 58. In operation, the spikes of the rollers 54 will bite into the ice, and as the chain is moved through rotation of the crank, the vehicle will be propelled without slippage.

The vehicle according to my invention may be driven with facility over any type of ground, whether the same is bare or covered with snow or ice. It may be used as a coaster, or as a foot power propelled sled, and will successfully navigate rough and hilly ground, operating it in the manner of a caterpillar tractor.

I have illustrated preferred and satisfactory embodiments of my invention, but it will be obvious that changes may be made therein, within the spirit and scope thereof, as defined in the appended claims.

Having thus described my invention, what I claim and desire to secure by Letters Patent is:—

1. In a vehicle of the character described, a pair of spaced runners, spaced sprocket gears having fixed axes, an endless sprocket chain extending over said gears and having its lower reach adapted to engage the ground substantially uniformly along its length irrespective of pressures at its ends, and crank means fixed to one of said gears adapted to be operated to rotate said gears and feed said chain.

2. In a vehicle of the character described, a pair of spaced runners, spaced sprocket gears, an endless sprocket chain extending over said gears, guide means disposed in parallel relation to the lower edges of said runners and adapted to engage the upper surface of the lower reach of said sprocket chain to project the lower surface relatively to said lower edges of the runners and in engagement with the ground, and means adapted to be operated to rotate said gears.

3. In a vehicle of the character described, a pair of spaced runners each comprising a pair of spaced metal strips disposed edgewise, an elongated spacing block between said strips having its lower surface spaced from the lower edges of the strips to form a guide-way, a pair of sprocket gears disposed one adjacent each end of said block, an endless sprocket chain extending over said gears with its lower reach disposed in said guide-way and adapted to engage the ground, and means adapted to be operated to rotate said gears.

4. In a vehicle of the character described, a pair of spaced runners, spaced sprocket gears, an endless sprocket chain including spaced apart rollers extending over said gears and having its lower reach adapted to engage the ground, means adapted to engage said rollers of the lower reach at the upper side of said chain, and means adapted to be operated to rotate said gears.

5. In a vehicle of the character described, a pair of spaced runners, spaced sprocket gears having fixed axes, an endless sprocket chain extending over said gears and having its lower reach adapted to engage the ground substantially uniformly along its length irrespective of pressures at its ends, and a pedal crank fixed to one of said gears adapted to be operated to rotate said gears and feed said chain.

6. In a vehicle of the character described, a pair of spaced runners, spaced sprocket gears having peripheral grooves adapted to receive tires, an endless sprocket chain extending over said gears and having its lower reach adapted to engage the ground, said chain being removable from said gears, and means adapted to be operated to propel said gears.

7. In a vehicle of the character described, a pair of spaced runners, spaced sprocket gears, supports for said gears having vertically spaced bearing means in either of which said gears may be engaged, an endless sprocket chain extending over said gears and having its lower reach adapted to engage the ground, and means adapted to be operated to rotate said gears.

Signed at Bridgeport, in the county of Fairfield and State of Connecticut, this 20th day of February, A. D. 1923.

MARTIN TATOSIAN.

Witnesses:
C. M. NEWMAN,
HARRY G. TATOSIAN.